L. SLIGER.

CARBURETER.

APPLICATION FILED APR. 25, 1914

Reissued Dec. 1, 1914.

13,837.

2 SHEETS—SHEET 1.

WITNESSES:

O. M. McLaughlin

J. A. Doyle.

INVENTOR.

LEONARD SLIGER.

BY

V. H. Lockwood

ATTORNEY.

L. SLIGER.

CARBURETER.

APPLICATION FILED APR. 25, 1914.

Reissued Dec. 1, 1914.

13,837.

2 SHEETS—SHEET 2.

WITNESSES:

O. M. McLaughlin

J. A. Boyle.

INVENTOR.

LEONARD SLIGER.

BY V. A. Lockwood

ATTORNEY.

UNITED STATES PATENT OFFICE.

LEONARD SLIGER, OF INDIANAPOLIS, INDIANA.

CARBURETER.

13,837. Specification of Reissued Letters Patent. Reissued Dec. 1, 1914.

Original No. 1,042,982, dated October 29, 1912, Serial No. 630,337. Application for reissue filed April 25, 1914. Serial No. 834,525.

*To all whom it may concern:*

Be it known that I, LEONARD SLIGER, a citizen of the United States, and a resident of the city of Indianapolis, in the county of Marion and State of Indiana, have invented a new and useful Carbureter, of which the following is a full, clear, and exact description.

My invention relates to carbureters, and more particularly to carbureters embodying atomizers and employed in connection with internal combustion engines.

Among the particular objects sought to be accomplished by my improved carbureter are the following: to more thoroughly atomize the hydro-carbon liquid; to maintain the hydro-carbon spray as near as practicable centrally in relation to the atomizing chamber through which it is forced to the engine throttle; to heat the atomizing chamber by aid of waste gases from the engine; to adapt the carbureter for use in connection with a variable inlet or damper; to enable most of the essential parts to be removed and replaced when worn out; to provide a new and efficient arrangement for controlling the needle valve in atomizing; and to provide an adjustable float so positioned within the apparatus as to afford peculiar advantages.

The chief feature of the invention consists in the means for passing a concentrated column of air at substantially a right angle across the end of the fuel nozzle so that the column of air will tend to facilitate the passage of hydro-carbon up through the nozzle into the atomizing chamber and to mix thoroughly with such hydro-carbon.

Another feature of the invention consists in an air inlet valve which is hollow and tapering so as to concentrate the incoming air in a concentrated stream and direct it across the nozzle in an atomizing chamber, said valve being yieldingly or spring mounted so that in emergency or under considerable suction of the engine, the incoming air will unseat the valve so that air will enter not only through the valve, but around the valve and thus quickly and greatly increase, for the time being, the quantity of incoming air.

The nature of the invention will be understood from the accompanying drawings and the following description and claims.

Figure 1:
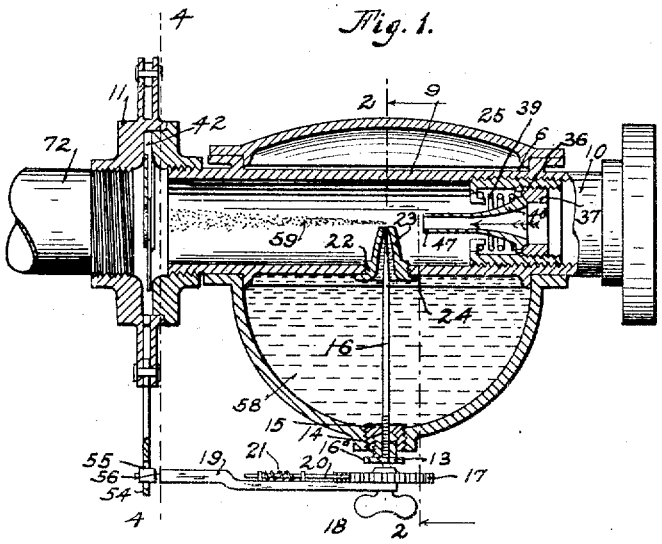
Figure 2:
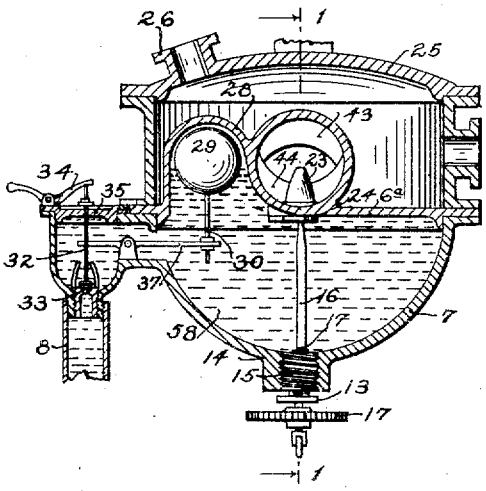
Figure 3:
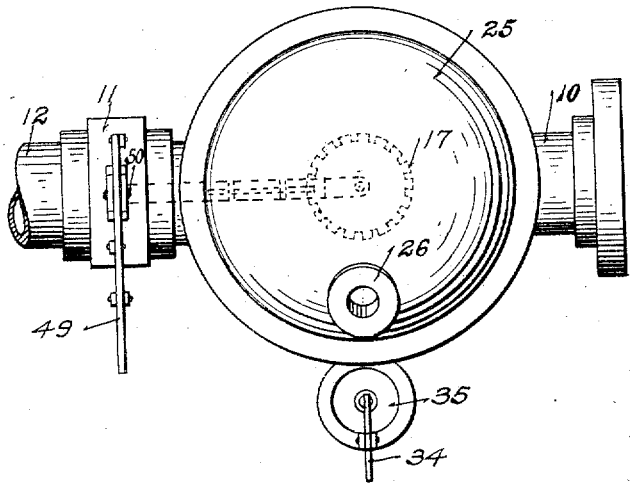
Figure 4:
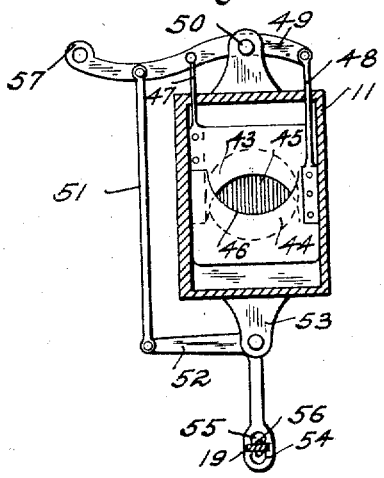
Figure 5:
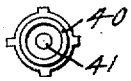

In the drawings, Figure 1 is a section on the line 1—1 of Fig. 2, looking in the direction of the arrow, and showing the improved throttle and atomizing chamber. Fig. 2 is a section on the line 2—2 of Fig. 1, looking in the direction of the arrow. Fig. 3 is a plan view of the carbureter complete. Fig. 4 is a detail showing in section the throttle. Fig. 5 is a detail showing the form of the inlet valve.

A heating chamber is shown at 6, and below it is a substantially hemispherical hollow member 7 used as a hydro-carbon chamber.

At 8 is a receptacle for holding hydro-carbon and supplying the same to the hydro-carbon chamber 7, as hereinafter described.

A tubular member 9 extends diametrically through the heating chamber 6, and is designated as an atomizing chamber. Connected with one end of this atomizing chamber is an inlet 10. A throttle casing 11 is connected with the other end of the atomizing chamber and is also connected with a pipe 12 leading to the engine.

At 13 is a needle valve.

The hydro-carbon chamber 7, at its bottom, is provided with an annular bead 14, and fitted into the hydro-carbon chamber at this point is a screw plug 15. A needle 16 is provided with a threaded portion 17 which extends through the screw plug 15, the latter being threaded internally for this purpose. A toothed wheel 17 is mounted rigidly upon the needle 16, and is employed for turning the same. A packing gland 16[a] is fitted upon the threaded portion of the needle 16 and is used to prevent leak from chamber 7. A thumb piece 18 is mounted rigidly upon the needle 16 and is employed for turning the latter by hand. A lever 19 is pivoted upon the needle 16 as a center, and is provided with a spring plunger 20 for engaging the surface of the toothed wheel 17. The spring plunger 20 is normally actuated by a spring 21 but may be moved by hand for the purpose of bringing it into and out of engagement with this wheel.

A nozzle 22 is threaded externally and is provided with an end portion 23. The nozzle 22 is also provided with a flange 24 for rendering it fluid-tight relatively to the atomizing chamber 9. The heating chamber 6 is provided with a cover 25 slightly convexed, as indicated in Figs. 1 and 2. This cover is provided with a nipple 26 which is connected with the engine, and is further provided with a nipple 27 to be connected with the exhaust of the engine. The gases of combustion and hot air from the engine escape through the nipple 26 into the heating chamber 6, and thence out through the nipple 27 to the exhaust. In doing this, the gases and hot air very effectively heat the atomizing chamber 9.

A partition 6ª separates the hydro-carbon chamber 7 from the heating chamber 6, and the atomizing chamber 9 is integral with this partition, as will be understood from Fig. 2. The partition 6ª is provided with a portion 28 having generally the form of a dome, and mounted within this portion is a ball float 29. A rod 30 extends downwardly from this float and is connected with a valve lever 31. The lever is also connected with a valve stem 32 which operates a valve 33. A hand lever 34 is connected with the valve stem 32. By operating the hand lever 34, the valve 33 is opened and closed so as to control the supply of liquid hydro-carbon from the receptacle 8 into the chamber 7. A valve sleeve 36 is threaded externally, and adjustably mounted within one end of the atomizing chamber 9, the latter being threaded internally for this purpose. A valve seat 37 having generally an annular form is adjustably mounted within the valve sleeve 36. For this purpose the valve sleeve is threaded internally and the valve seat 37 is threaded externally. The valve sleeve 36 is further provided with lugs 38 extending inwardly and slightly hooked, as will be understood from Fig. 1. Engaging these hooks is a spiral spring 39. A valve member 40, having generally the form of a funnel, is shaped so as to mate the adjacent surface of the valve seat 37. The valve member 40 is provided with an extending portion 41, the axis of which is substantially in alinement with the end portion 23 of the nozzle 22. The spring 39 is of such proportions that the spring may be compressed whenever there is any undue suction brought to bear upon the valve member 40 in the direction indicated by the arrow. The slight reciprocating movement of the valve member 40 for the purpose stated does not disarrange the valve member relative to its surroundings. This is because the portion of the valve member adjacent to its seat 37 is conical so that the valve member corrects its position each time it is forced back against its seat.

The throttle casing 11 is provided with a narrow passage 42 and disposed within the latter are two blades 43, 44 provided respectively with curved edges 45, 46. These curved edges normally cross each other, as indicated in Fig. 4, so that the space between these edges may be varied by shifting the relative positions of the blades. The blades 43, 44 are slidably mounted within the passage 42, the blade 43 being carried upon a stem 47 and the blade 44 being mounted upon a stem 48. A lever 49 is mounted upon a pivot 50 and is pivotally connected to the stems 47, 48, as will be understood from Fig. 4, so that when the lever 49 is shifted slightly in a counter-clockwise direction, according to this figure, the opening between the edges 45, 46 is reduced, whereas a slight movement of the lever 49 in a clockwise direction causes the opening to become enlarged. Pivotally connected with the lever 49 is a pitman 51, the latter being connected at its lower end to a bell crank lever 52. This bell crank lever is pivotally mounted upon a bracket 53, and is provided with an eye 54, the latter having a slot 55. The lever 19, see Fig. 1, carries a small roller 56 which extends through the slot 55. The lever 49 is provided at its outer or free end with an eye 57 by aid whereof it may be connected with an appropriate part controllable by the governor. The supply of hydro-carbon within the hydro-carbon chamber 7 is shown at 58, see Figs. 1 and 2; and the spray due to atomizing is shown at 59 in Fig. 1.

The operation of my device is as follows: The parts being arranged as above described, the plunger 20 is disengaged from the wheel 17 and by aid of the thumb piece 18 the needle 16 is turned until it is so adjusted relatively to the nozzle 26 as to enable this nozzle to discharge into the atomizing chamber 9 a suitable quantity of the hydro-carbon 58. The engine being now started up, a partial vacuum is created in the pipe 12, and as a consequence, air is drawn in through the air inlet 10. This air is, by virtue of the shape of the valve member 40, concentrated in the form of a stream flowing centrally through the atomizing chamber 9, the portion 23 of the nozzle 22 extending to the approximate center of this stream. The hydro-carbon is thus atomized, being broken up into an exceedingly fine spray and thoroughly mixed with the incoming air. If, for any reason, the engine happens to produce an undue suction in the atomizing chamber 9, the valve member 40 is dislodged slightly and the spring 39 compressed accordingly, so that the valve member 40 moves slightly to the left, according to Fig. 1. The valve member 40 being thus disengaged from the annular seat 37, the air rushes around the outside of the valve member 40, as well as through its center. The air supply is thus greatly increased.

In order to increase or diminish the quantity of the hydro-carbon liquid thus being atomized, the wheel 17 is turned by hand so as to displace the point of the needle 16 to a greater or lesser extent relatively to the inside of the portion 23 of the nozzle 22. Whenever the lever 49, see Fig. 4, is turned in a counter-clockwise direction, that is, whenever the eye 57 is depressed, the blades 43, 44 of the throttle are shifted relatively to each other as above described, so as to curtail the opening presented by the throttle. This, however, is not all that occurs in this connection. The pitman 51 being depressed, the bell crank lever 52 is rocked slightly in a counter-clockwise direction according to Fig. 4, the result being that the lever 19 is turned slightly in relation to the general position of the hydrocarbon chamber 7, and in being thus turned, causes a partial turning of the needle 16. The partial rotation of this needle, by virtue of the blades 17, causes the needle to partially close the opening of the nozzle 23 and thus curtail the quantity of hydro-carbon being formed into the spray 59. The reduction in the quantity of hydro-carbon being atomized, and the reduction in the quantity of carbureted air being drawn through the throttle, take place at the same time; hence, the reduction in the volume of combustible mixture supplied to the engine tends to maintain at all times a degree of richness which is substantially constant; that is to say, when air is passing freely through the atomizing chamber, the hydro-carbon liquid is also being supplied to the atomizing chamber, and when the air supply is restricted the hydro-carbon supply is likewise restricted. In case, however, of an excessive vacuum being formed in the atomizing chamber, the supply of air is increased slightly owing to the dislodgment of the valve member 40, as above described, the net result being that while the quantity of air passing through is greater than usual, the air is slightly poorer in hydro-carbon with which it is permeated.

The invention claimed is:

1. In a carbureter, an atomizing chamber, a hydrocarbon liquid nozzle projecting into said chamber, and a tapering tubular air valve adapted to concentrate and direct a column of air across the outlet end of the nozzle and arranged to open under the influence of an increased volume of incoming air.

2. In a carbureter, an atomizing chamber with an air inlet opening, a hydrocarbon liquid nozzle projecting into said chamber, and a tapering tubular air valve with the large end thereof located in the air inlet opening of the atomizing chamber and with the small end thereof directed toward the outlet end of the nozzle so that said valve will concentrate the incoming air and direct it across the end of the nozzle and arranged to open under the influence of an increased volume of incoming air and when open to permit the admission of a greater volume of air than when closed.

3. In a carbureter, an atomizing chamber, a hydrocarbon liquid nozzle projecting into said chamber, and a yieldingly mounted tapering tubular air valve adapted to direct the air passing through it in a concentrated column across the end of the nozzle, said valve being so mounted that it will be caused to yield and open under the influence of incoming air and permit air to enter said atomizing chamber around said valve as well as through said valve.

4. In a carbureter, an atomizing chamber with an air inlet opening, a hydro-carbon liquid nozzle projecting into said chamber, a tapering tubular air valve with its large and outer end normally bearing against the wall of said chamber surrounding said air inlet opening so no air will pass around said valve and with the small end of the valve extending toward the end of the nozzle, and a spring for yieldingly holding said valve to its seat against the wall of the chamber surrounding the air inlet opening whereby increased volume of incoming air will move the valve inward and allow additional air to enter by passing around the valve.

5. In a carbureter, a substantially tubular atomizing chamber, a hydro-carbon liquid nozzle projecting radially into said chamber between the ends thereof, a threaded sleeve adapted to screw into the air inlet end of said chamber and having inwardly extending projections on the inner end thereof, an annular valve seat adapted to screw into said sleeve, a tapering valve with the large end engaging said seat and with the small end of the valve directed toward the end of said nozzle, and a spiral spring surrounding said valve and at one end bearing against the large end of said valve to yieldingly hold it seated and the other end engaging the inward projections from said sleeve, substantially as set forth.

6. In a carbureter, the combination of a hydro-carbon chamber, an atomizing chamber having generally the form of a tube and extending diametrically across said hydro-carbon chamber, a throttle, a nozzle extending from said hydro-carbon chamber into said atomizing chamber, a mechanism co-acting with said throttle and with said nozzle for maintaining a relation between the quantity of hydro-carbon flowing from said nozzle and the quantity of explosive mixture flowing through said throttle, and means for normally admitting and confining a current of air to the proximate center of said atomizing chamber and past the mouth of said nozzle, said means being automatically adjustable to vary the supply of air in accordance with the volume of explosive mixture flowing through said throttle.

7. In a carbureter, the combination of a hydro-carbon chamber, an atomizing chamber having generally the form of a tube and extending across said hydro-carbon chamber, a heating chamber disposed adjacent to said hydro-carbon chamber and said atomizing chamber, a nozzle extending from said hydro-carbon chamber into said atomizing chamber, a throttle, a mechanism co-acting with said throttle and including means to vary the flow of hydro-carbon through said nozzle, a movable air funnel within said atomizing tube, a member within said tube and against which the base of said funnel is normally adapted to seat in order to cause the current of air delivered past the nozzle to be confined to the proximate center of the atomizing tube, and means for holding said air funnel against its seat, adapted to permit of its movement away from the seat in order to vary the amount of air admitted when suction, caused by the outflow of mixture through the throttle, increases.

8. In a carbureter, the combination of an atomizing chamber, an air inlet for supplying air thereinto, a valve for controlling the flow of liquid hydro-carbon into said atomizing chamber, said valve having a movable needle, a toothed wheel secured upon said needle, a lever having connection with said needle and movable relatively to said wheel, a member carried by said lever and normally engaging said wheel, said member being detachable from said wheel to enable said wheel and the needle to be independently adjusted, a throttle, and mechanism connected with said throttle and with said lever for the purpose of maintaining the throttle and lever in a predetermined rocking relation.

9. In a carbureter, the combination of a hydro-carbon chamber having generally a hemispherical form, a heating chamber disposed adjacent to said hydro-carbon chamber, an atomizing chamber having the form of a tube and extending in the general direction of its length between said hydro-carbon chamber and said heating chamber, a nozzle extending from said hydro-carbon chamber and transversely into said atomizing chamber, and automatically adjustable means for admitting variable quantities of air into said atomizing chamber and for causing said air to form a stream flowing axially of the chamber and past said nozzle in order to atomize the hydro-carbon from the latter into said atomizing chamber.

10. In a carbureter, the combination of an atomizing chamber having generally a tubular form, a nozzle extending radially into said atomizing chamber for the purpose of discharging hydro-carbon liquid thereinto, a valve seat mounted within said atomizing chamber and having its axis substantially in alinement with the end of said nozzle, a valve having generally a tubular form and detachably engaging said valve seat, and a spring for normally forcing the same against its seat.

In testimony whereof I have signed my name to this specification in the presence of two subscribing witnesses.

LEONARD SLIGER.

Witnesses:
O. M. McLaughlin,
J. H. Wells.